W. M. MANSFIELD.
VEHICLE WHEEL.
APPLICATION FILED AUG. 5, 1918.
1,327,343.
Patented Jan. 6, 1920.
2 SHEETS—SHEET 1.
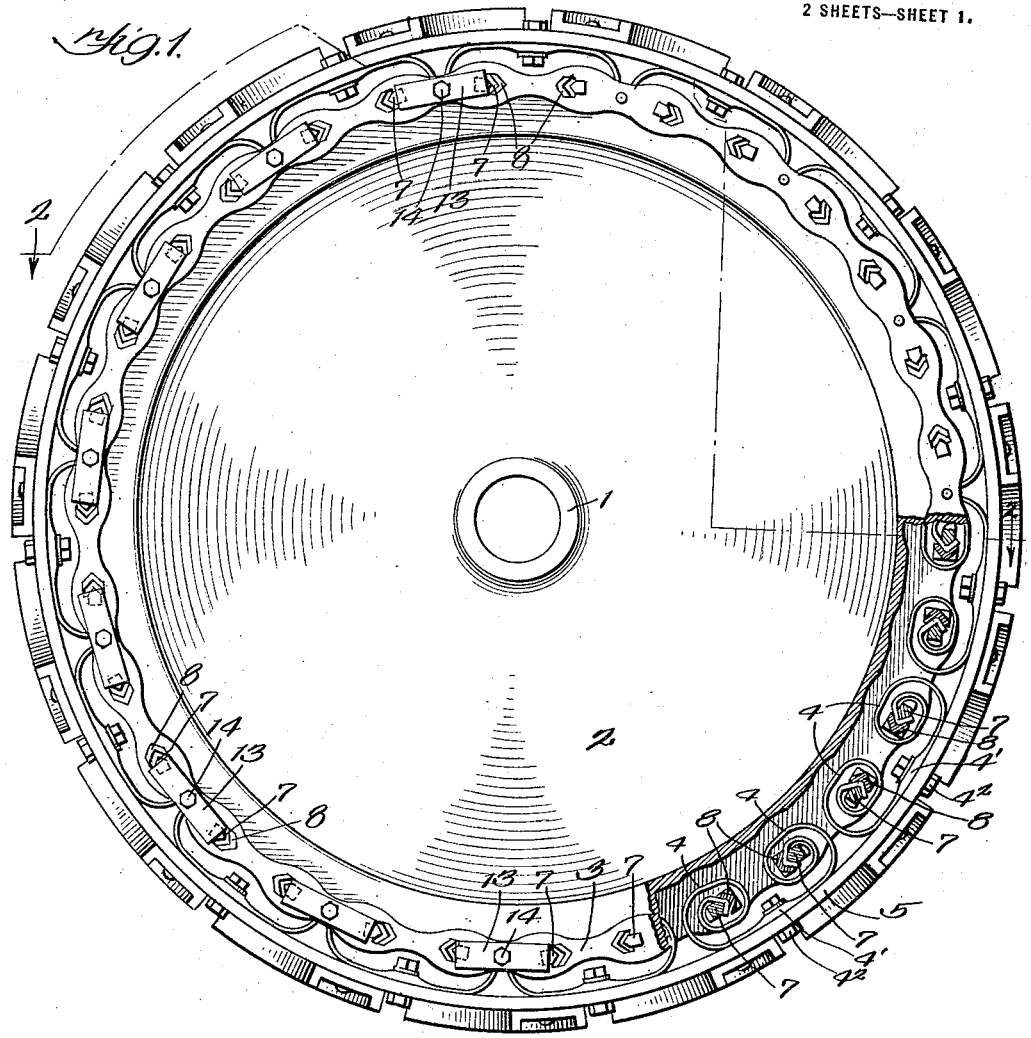
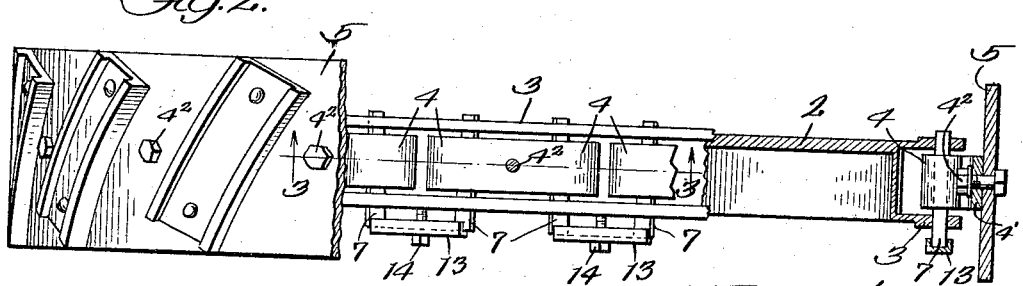
Inventor:
Warren M. Mansfield.
By G. L. Gragg atty.

W. M. MANSFIELD.
VEHICLE WHEEL.
APPLICATION FILED AUG. 5, 1918.
1,327,343.
Patented Jan. 6, 1920.
2 SHEETS—SHEET 2.
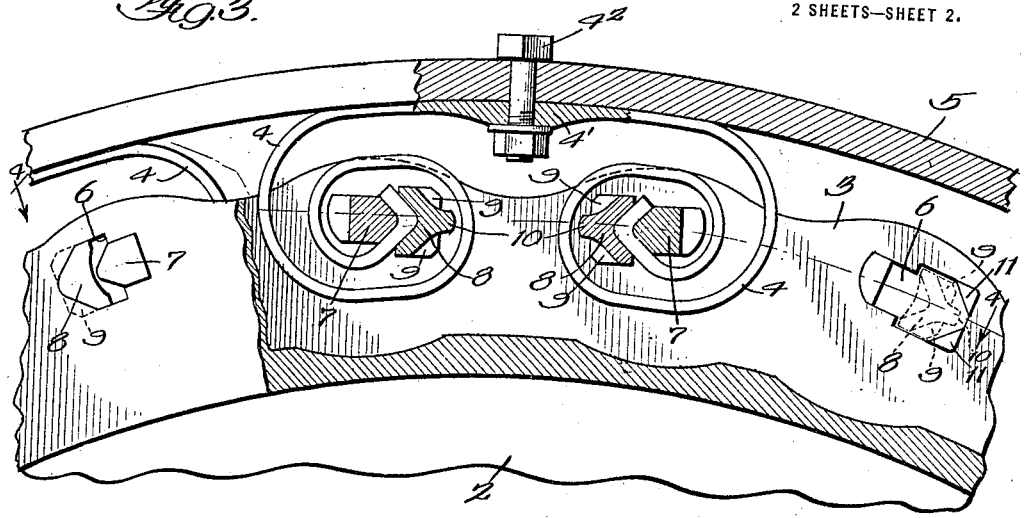
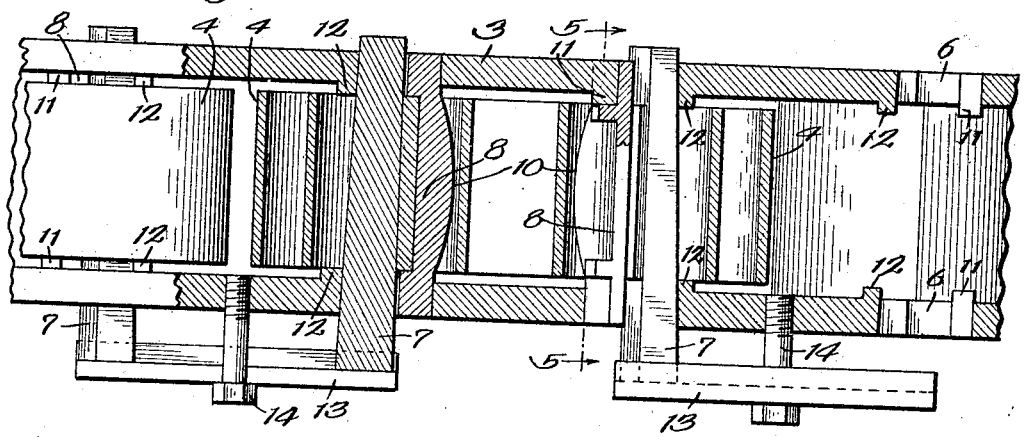
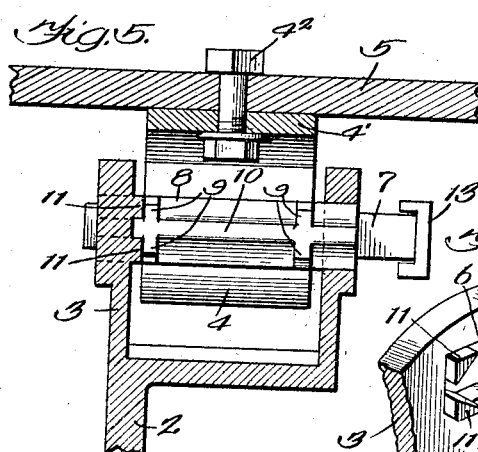
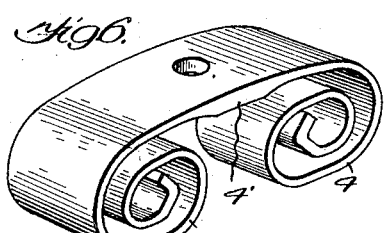
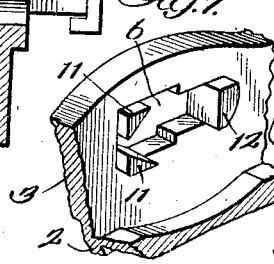

UNITED STATES PATENT OFFICE.

WARREN M. MANSFIELD, OF DAVENPORT, IOWA.

VEHICLE-WHEEL.

1,327,343.   Specification of Letters Patent.   Patented Jan. 6, 1920.

Application filed August 5, 1918. Serial No. 248,385.

*To all whom it may concern:*

Be it known that I, WARREN M. MANSFIELD, citizen of the United States, residing at Davenport, in the county of Scott and State of Iowa, have invented a certain new and useful Improvement in Vehicle-Wheels, of which the following is a full, clear, concise, and exact description.

My invention relates to those vehicle wheels which are employed either to replace wheels that have pneumatic tires or to relieve the severe shocks and vibrations in slow moving vehicles, such as trucks and tractors, that are otherwise unprovided with springs or which merely have springs placed between the axles and frames or between the bolsters and the loads, leaving the wheels and axles as " unsprung " weight. Tractors, in particular, are rarely provided with cushioning springs of any sort and those springs which are employed are generally placed on the front axles and carry only about a third of the weight. As much of the weight as possible should be borne by springs and the logical location for such springs is in the rims of the vehicle wheels, for the springs, when so located, absorb the shocks and vibrations sufficiently before reaching any part of the machine or vehicle so equipped. Properly designed spring wheels would permit more rigid and simple construction of the vehicle frames.

The vehicle wheel of my invention is of particular service in construction of slow moving vehicles which hitherto have had no load supporting spring mechanism, though my invention is not to be limited to this use.

In carrying out my invention I employ leaf springs, and, in accordance with one of the features of the invention, I anchor these leaf springs by means of assembling keys, ends of the springs being interposed between these keys and separable mounting blocks which are also held in place by the keys.

The ends of the springs, in accordance with another feature of the invention, are thickened where they are anchored to avoid breakage.

The wheel of my invention has other features and characteristics, the invention being more fully explained in connection with the accompanying drawings showing the preferred embodiment thereof and in which Figure 1 is a side view of a wheel made in accordance with the invention; Fig. 2 is a sectional view on line 2—2 of Fig. 1; Fig. 3 illustrates, on a larger scale, a sector of the wheel taken generally on line 3—3 of Fig. 2, parts being shown in full elevation and other parts in section; Fig. 4 is a sectional view on line 4—4 of Fig. 3; Fig. 5 is a sectional view on line 5—5 of Fig. 4; Fig. 6 is a perspective view of one of the springs as it is preferably constructed; Fig. 7 is a perspective view illustrating a portion of the wheel that receives the assembling key and block; Fig. 8 is a perspective view of an assembling key; and Fig. 9 is a perspective view of an assembling block.

Like parts are indicated by similar characters of reference throughout the different figures.

The wheel hub 1 may be provided with a surrounding disk 2 instead of the usual spokes but the invention is not to be limited to such construction. The disk carries an inner circular wheel rim 3 which is concentric or co-axial with the hub and is so maintained by the rigid disk. This rim 3 is preferably of channel formation with the annular channel in the general plane of the wheel hub 1 and disk 2. The base of the channel rim 3 is at the periphery of the disk 2, the channel being open at the periphery of the rim 3 so that the leaf springs 4 which are employed in the construction of the wheel may be partially disposed in the channel and may project outwardly therefrom for the attachment thereto of the outer or tread rim 5 that surrounds the rim 3. The springs 4 are preferably formed in couples or pairs, the springs of each pair being symmetrically positioned, the inner ends of the springs being merged and thickened where merged as indicated at $4^1$ while the outer ends of such springs are spirally wound and also thickened where they are to be attached, this thickening of the springs preventing breakage thereof. The two springs together form a structure generally of U-shape with the sides of the U curled to form spirals. Bolts $4^2$ are employed to assemble each pair of springs and the tread rim 5. This rim 5 is held by the springs 4 in the general plane of the wheel or so that it does not move axially of the wheel, the springs performing this function while at the same time allowing the wheel to move radially thereof or in the general plane of the wheel, there being ample clearance for this purpose between the periphery of the rim 3 and the inner curved face of the rim 5. A wheel thus constructed is able to absorb axial or end thrusts without improperly disturbing the relation of the wheel tread and wheel hub while permitting flexure of the wheel structure, as a whole, to absorb shocks and vibrations encountered by the travel of the vehicle supplied therewith.

In order to secure the required rigidity axially of the wheel and to afford the simple means of assembling the leaf springs with one of the rims, preferably the inner rim 3, I have formed such rim with openings 6 in the radial side walls thereof, the openings 6 in each radial rim wall being alined, parallel with the axis of the wheel, with corresponding openings in the other radial rim wall, and have disposed in these openings assembling keys 7 which serve to hold the ends of the springs in tight engagement with the mounting blocks 8 whose ends are also desirably disposed in said openings. Each mounting block is desirably inserted endwise through a pair of alined openings 6, these openings being sufficiently elongated circumferentially of the wheel to permit one or the other of the two pairs of end lugs 9 and the longitudinal strengthening rib 10 provided upon the mounting block to pass through one opening as the mounting block is being placed across the channel of the inner rim into the other opening. After the mounting block has been caused to span the channel in the mounting rim 3, it is moved circumferentially until the lugs 9 have their outer end faces brought between the insetting lugs 11 upon the two walls of the rim 3. These lugs 9 and 11 then coöperate to prevent the mounting block 8 from moving axially of the wheel so that the end of the spring which is held in rigid relation with the mounting block, as will hereinafter appear, is prevented from moving axially of the wheel. Each mounting block is desirably V-shaped in cross section and has a V-shaped pocket which receives the corresponding V-shaped end of the spring 4 that is to be held by the mounting block, this pocket having radial side walls between which the corresponding end of the spring is snugly received so that the mounting block, when held from axial movement by the coöperating lugs 9 and 11, will prevent axial movement of the end of the spring held thereby. The means which I preferably employ for holding the mounting block with its lugs 9 between and in facial contact with the lugs 11 upon the inner end 3 is the assembling key 7 that is received in one end of each of the two alined openings 6. These keys are preferably slightly tapered to hold them in position after they have been driven into place, it being permissible to use considerable force in driving the keys to position since the mounting blocks 8 are not only held from movement circumferentially of the wheel by the converging faces of the lugs 11 but are also held from circumferential movement by the radial walls of the channels 3 directly since the mounting blocks project at their ends into the planes of these radial walls. The radial walls of the rim 3 are also provided with insetting lugs 12 which margin the other ends of the openings 6 opposite the ends where the lugs 11 are disposed. The inner radial faces of these lugs 12 are flush with the openings 6 whereby the keys 7 have extended contact at their ends with the rim structure 3 to enable the keys to be strongly and firmly held in the positions to which they are driven to hold the mounting blocks 8 in place. The keys 7 are desirably V-shaped in cross section. The V-shaped ends of the springs conform upon their exteriors to the V-shaped pockets in the mounting blocks 8 and upon their interiors to the V-shape of the assembling keys. The end portions of the springs that are received between the mounting blocks and the assembling keys are thickened, the thickening of the springs commencing shortly before the mounting block and key engaged portions of the springs are reached.

The keys, although tapering sufficiently practically to assure their retention in position after they are driven home, are, nevertheless, preferably further held in place by the clips 13 which are pressed against the larger ends of the keys and held in contact therewith by means of bolts 14 passing through the clips and into threaded engagement with the inner wheel rim 3. One clip serves to engage the keys pertaining to two pairs of springs. As the springs are preferably formed in pairs, a single bolt $4^2$ is sufficient to assemble two springs with the tread rim, rotation of each pair of springs about its retaining bolt being prevented owing to the anchorage of the spiral outer ends of such springs to the inner wheel rim by the mounting blocks and assembling keys that have been fully described. By this construction the inner wheel rim and the outer tread rim of the wheel are immovable with respect to each other axially of the wheel while at the same time relative motion is permitted between these rims in the plane of the wheel to enable the springs properly to function. The disk 2 is desirably in the plane of one of the radial walls of the channel, this disk thus being in effect continued to the outer periphery of the rim 3 to increase the combined strength of the said disk and rim.

The deflection of the springs when loaded causes the center of the tread rim to move from the center of the hub and if the tread rim is sufficiently rigid substantially to maintain a true circle the travel of the outer spiral shaped ends of the springs relative to the tread rim will be normal to the surface on a vertical line and tangential on a horizontal line and the travel will be equal in both cases. The movements of the ends of the springs should, in all directions, be in the plane of the wheel. Generally speaking the springs should require the same number of pounds to produce a given deflection in all directions, a result which is most nearly attained by spirally shaping the outer ends of the springs. The spirals which I have employed in the formation of the springs are not perfectly true because of the limited space between the tread rim and the inner rim. The spirals are elongated circumferentially of the wheel and will therefore carry more load in a tangential direction than they would normal to the surface of the rim. This construction is especially suitable where the wheel is employed as a driving or propelling wheel.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A vehicle wheel including an inner rim; a tread rim surrounding the inner rim and movable in the plane of the wheel with respect thereto, one of said rims being of channel formation with two channel walls; a plurality of pairs of leaf springs, the leaf springs of each pair being merged and there attached to one of said rims, the springs of each pair forming a U-shaped structure whose sides are spirally shaped and whose outer ends are of V-form; mounting blocks having V-pockets receiving the V-formed ends of the springs, these mounting blocks being provided with lugs on their sides which are spaced apart from the ends of the blocks, these blocks passing through openings in the aforesaid channel walls and having their lugs in engagement with the inner ends of insetting lugs that are provided upon said channel walls; V-shaped tapering assembling keys engaging the V-shaped ends of the springs to maintain them in the V-pockets of the mounting blocks, said channel walls having lugs that are also engaged by said keys which also pass through the openings that receive said mounting blocks; key retaining clips engaging the outer ends of the keys; and bolts upon one of the channel walls that maintain said clips in engagement with said keys.

2. A vehicle wheel including an inner rim; a tread rim surrounding the inner rim and movable in the plane of the wheel with respect thereto, one of said rims being of channel formation with two channel walls; a plurality of pairs of leaf springs, the leaf springs of each pair being merged and there attached to one of said rims, the springs of each pair forming a U-shaped structure whose sides are spirally shaped and whose outer ends are of V-form; mounting blocks having V-pockets receiving the V-formed ends of the springs, these blocks passing through openings in the aforesaid channel walls; V-shaped tapering assembling keys engaging the V-shaped ends of the springs to maintain them in the V-pockets of the mounting blocks, said keys also passing through the openings that receive said mounting blocks; key retaining clips engaging the outer ends of the keys; and bolts upon one of the channel walls that maintain said clips in engagement with said keys.

3. A vehicle wheel including an inner rim; a tread rim surrounding the inner rim and movable in the plane of the wheel with respect thereto, one of said rims being of channel formation with two channel walls; a plurality of pairs of leaf springs, the leaf springs of each pair being merged and there attached to one of said rims, the springs of each pair forming a U-shaped structure whose sides are spirally shaped and whose outer ends are of V-form; mounting blocks having V-pockets receiving the V-formed ends of the springs, these blocks passing through openings in the aforesaid channel walls; and V-shaped assembling keys engaging the V-shaped ends of the springs to maintain them in the V-pockets of the mounting blocks, said keys also passing through the openings that receive said mounting blocks.

4. A vehicle wheel including an inner rim; a tread rim surrounding the inner rim and movable in the plane of the wheel with respect thereto, one of said rims being of channel formation with two channel walls; a plurality of leaf springs attached to one of said rims, the springs having spirally shaped ends terminating in V-formation; mounting blocks having V-pockets receiving the V-formed ends of the springs, these blocks passing through openings in the aforesaid channel walls; V-shaped tapering assembling keys engaging the V-shaped ends of the springs to maintain them in the V-pockets of the mounting blocks, said keys also passing through the openings that receive said mounting blocks; key retaining clips engaging the outer ends of the keys; and bolts upon one of the channel walls that maintain said clips in engagement with said keys.

5. A vehicle wheel including an inner rim; a tread rim surrounding the inner rim and movable in the plane of the wheel with respect thereto; a plurality of leaf springs each anchored at one end to one of said rims; and mounting blocks carried by the other rim and provided with V-shaped pockets having side walls engaging the sides of the remaining ends of said springs which spring ends are V-shaped correspondingly to said pockets.

6. A vehicle wheel including an inner rim; a tread rim surrounding the inner rim and movable in the plane of the wheel with respect thereto; a plurality of leaf springs each anchored at one end to one of said rims; mounting blocks carried by the other rim and provided with V-shaped pockets having side walls engaging the sides of the remaining ends of said springs, which spring ends are V-shaped correspondingly to said pockets; and keys for holding the mounting blocks in assembly with the rim carrying them and also engaging the ends of the springs that are received in the aforesaid pockets to hold them in such pockets, these spring ends being interposed between the mounting blocks and keys while the keys have V-shaped portions corresponding to the V-shaped portions of the springs that receive the V-shaped portions of the keys.

7. A vehicle wheel including an inner rim; a tread rim surrounding the inner rim and movable in the plane of the wheel with respect thereto, one of said rims being of channel formation with channel walls which have openings therein; mounting blocks having lugs on their sides and near their ends that engage the inner portions of said rim walls to prevent movement of the mounting blocks axially of the wheel; and leaf springs having ends held in engagement with said blocks and the remaining ends in engagement with the rim which does not carry said blocks, said mounting blocks having V-shaped pockets provided with side walls which engage the sides of the springs to prevent movement of the springs axially of the wheel, the portions of the springs engaging said mounting blocks being correspondingly V-shaped.

8. A vehicle wheel including an inner rim; a tread rim surrounding the inner rim and movable in the plane of the wheel with respect thereto, one of said rims being of channel formation with channel walls which have openings therein; mounting blocks having lugs on their sides and near their ends that engage the inner portions of said rim walls to prevent movement of the mounting blocks axially of the wheel; leaf springs having ends held in engagement with said blocks and the remaining ends in engagement with the rim which does not carry said blocks; and keys for maintaining the mounting blocks in assembly with the rim carrying them, the springs being interposed between the keys and the mounting blocks.

9. A vehicle wheel including an inner rim; a tread rim surrounding the inner rim and movable in the plane of the wheel with respect thereto, one of said rims being of channel formation with channel walls which have openings therein; mounting blocks having lugs on their sides and near their ends that engage the inner portions of said rim walls to prevent movement of the mounting blocks axially of the wheel; leaf springs having ends held in engagement with said blocks and the remaining ends in engagement with the rim which does not carry said blocks, said mounting blocks having pockets provided with side walls which engage the sides of the springs to prevent movement of the springs axially of the wheel; and keys for maintaining the mounting blocks in assembly with the rim carrying them, the springs being interposed between the keys and the mounting blocks.

10. A vehicle wheel including an inner rim; a tread rim surrounding the inner rim and movable in the plane of the wheel with respect thereto, one of said rims being of channel formation with channel walls which have openings therein; mounting blocks having lugs on their sides and near their ends that engage the inner portions of said rim walls to prevent movement of the mounting blocks axially of the wheel; leaf springs having ends held in engagement with said blocks and the remaining ends in engagement with the rim which does not carry said blocks, said mounting blocks having V-shaped pockets provided with side walls which engage the sides of the springs to prevent movement of the springs axially of the wheel, the portions of the springs engaging said mounting blocks being correspondingly V-shaped; and keys for maintaining the mounting blocks in assembly with the rim carrying them, the keys being V-shaped correspondingly to the V-shaped portions of the springs, the springs being interposed between the keys and the mounting blocks.

In witness whereof I hereunto subscribe my name this 12th day of July A. D., 1918.

WARREN M. MANSFIELD.